US011457390B2

(12) United States Patent
Lin et al.

(10) Patent No.: US 11,457,390 B2
(45) Date of Patent: Sep. 27, 2022

(54) METHOD AND SYSTEM FOR AUTOMATICALLY RESUMING CALL AFTER NETWORK HANDOVER

(71) Applicant: YEALINK (XIAMEN) NETWORK TECHNOLOGY CO., LTD., Xiamen (CN)

(72) Inventors: Yanzhang Lin, Xiamen (CN); Zhibin Li, Xiamen (CN); Lianchang Zhang, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 33 days.

(21) Appl. No.: 16/999,824

(22) Filed: Aug. 21, 2020

(65) Prior Publication Data

US 2021/0058841 A1 Feb. 25, 2021

(30) Foreign Application Priority Data

Aug. 23, 2019 (CN) .......................... 201910781117.0

(51) Int. Cl.
*H04W 36/14* (2009.01)
*H04W 76/19* (2018.01)
*H04W 36/00* (2009.01)

(52) U.S. Cl.
CPC ........ *H04W 36/14* (2013.01); *H04W 36/0011* (2013.01); *H04W 76/19* (2018.02)

(58) Field of Classification Search
CPC . H04W 36/14; H04W 36/0011; H04W 76/19; H04W 36/00
See application file for complete search history.

(56) References Cited

U.S. PATENT DOCUMENTS

2007/0189220 A1* 8/2007 Oberle ................ H04L 65/1083
370/331
2007/0232297 A1* 10/2007 Noda .................... H04W 76/19
455/426.2

(Continued)

FOREIGN PATENT DOCUMENTS

EP 2712232 A2 * 3/2014 ........ H04W 36/0022

OTHER PUBLICATIONS

Boteler et al., "FreeSwitch Intercom," published at https://freeswitch.org/confluence/display/FREESWTICH/Intercom, May 15, 2016, p. 1 (Year: 2016).*

*Primary Examiner* — Un C Cho
*Assistant Examiner* — Lalita W Pace

(57) ABSTRACT

The present disclosure discloses a method and a system for automatically resuming a call after network handover, and belongs to the field of network calls. In the method of the present disclosure, during a call between a first terminal and a second terminal, when the first terminal is handed over from a first network to a third network, the first terminal first stores call resources, then registers with a server through the third network, constructs a resume request, and sends the resume request to the second terminal via the server, and the second terminal resumes the call with the first terminal according to the resume request. The present disclosure can ensure communication stability after network handover of a communication device, thereby avoiding call interruption caused by the network handover during communication of the communication device.

4 Claims, 2 Drawing Sheets

(56) References Cited

U.S. PATENT DOCUMENTS

| | | | |
|---|---|---|---|
| 2009/0215438 A1* | 8/2009 | Mittal | H04L 65/1046 |
| | | | 455/418 |
| 2009/0285175 A1* | 11/2009 | Nix | H04L 29/125 |
| | | | 370/331 |
| 2011/0289201 A1* | 11/2011 | Lochbaum | H04L 65/1053 |
| | | | 709/223 |
| 2012/0096176 A1* | 4/2012 | Kiss | H04L 61/106 |
| | | | 709/228 |
| 2016/0183144 A1* | 6/2016 | Vallabhu | H04W 36/0011 |
| | | | 370/331 |
| 2016/0219644 A1* | 7/2016 | Zhao | H04W 76/12 |
| 2018/0063764 A1* | 3/2018 | Bollapalli | H04L 65/1073 |

* cited by examiner

METHOD AND SYSTEM FOR AUTOMATICALLY RESUMING CALL AFTER NETWORK HANDOVER

CROSS REFERENCE TO RELATED APPLICATIONS

The present application claims the benefit of Chinese Patent Application No. CN201910781117.0 filed on Aug. 23, 2019, the contents of which are hereby incorporated by reference.

BACKGROUND

Technical Field

The present application relates to the field of network calls, and more specifically, to a method and a system for automatically resuming a call after network handover.

Related Art

With the development of network technologies, more people use VOIP mobile phone software to make calls. At present, all mobile phones on the market tend to apply have a same network connection strategy: when a Wi-Fi network and a 4G network simultaneously exist, the mobile phone is preferentially handed over to the Wi-Fi network, and is automatically handed over to the 4G network after leaving Wi-Fi coverage. Therefore, during a call, if the mobile phone enters the Wi-Fi coverage from the 4G network or leaves the Wi-Fi coverage, the mobile phone automatically performs network handover. In this case, the mobile phone is at black screen such that the call is silent or disconnected directly.

For the above problem, the prior art provides some solutions, for example, the invention entitled "NETWORK HANDOVER METHOD AND NETWORK HANDOVER SYSTEM DURING CALL SERVICE PROCESSING" (Application Date: Oct. 29, 2015; Application No: 201510733073.6). The solution discloses a network handover method and a network handover system during call service processing, and the network handover method includes: when determining that a call process with a second terminal needs to be handed over from a first network to a second network, simultaneously sending, by a first terminal, same call data to the second terminal through the first network and the second network; receiving, by an IP multimedia subsystem in which the second terminal is located, the call data sent by the first terminal, and feeding back data synchronization information to a base station; determining, by the base station, whether the call data is synchronized according to the data synchronization information, and if no, sending the data synchronization information to an access point; adjusting, by the access point and/or the base station, transmission resources allocated to the first terminal according to the data synchronization information, so that the call data sent by the first terminal to the second terminal through the first network and the second network is synchronized; and when determining that the call data is synchronized, instructing, by the base station, the first terminal to disconnect from a network entity of the first network to complete network handover. This solution can implement handover between Wi-Fi network and a mobile communication network on the premise of ensuring that a call service is not interrupted and a call process is continuous. However, a disadvantage of this solution is that the second terminal needs to feed back whether the call data of the first terminal is synchronized, which not only occupies network resources, but also reduces a speed of call resuming.

In view of the above, how to overcome shortcomings of call interruption caused by network handover in the prior art is a problem that needs to be urgently resolved in the prior art.

SUMMARY

1. Problems to be Resolved

In order to overcome shortcomings in the prior art that during a call of two parties' communication devices, the call is interrupted when one party's communication device performs network handover, the present disclosure provides a method and a system for automatically resuming a call after network handover, so that stability of the communication device after the network handover can be ensured, thereby avoiding call interruption caused by the network handover during communication of the communication device.

2. Technical Solutions

In order to resolve the foregoing problem, the technical solutions adopted by the present application are as follows:

A method for automatically resuming a call after network handover in the present application includes: registering, by a first terminal, with a server through a first network, and registering, by a second terminal, with the server through a second network; sending, by the first terminal, a call request to the second terminal via the server, and responding, by the second terminal, to the call request through the server and establishing a call with the first terminal; and during the call between the first terminal and the second terminal, when the first terminal is handed over from the first network to a third network, first storing, by the first terminal, call resources, then registering with the server through the third network, constructing a resume request according to the stored call resources, first terminal information, and second terminal information, and sending the resume request to the second terminal via the server, and resuming, by the second terminal, the call with the first terminal according to the resume request. Specifically, the first terminal registers with the server through registration signaling a, and the second terminal registers with the server through registration signaling b; and the first terminal calls the second terminal through call signaling a, the second terminal accepts the call signaling a of the first terminal through ring signaling a and response signaling a, and the first terminal sends acknowledgement signaling a to confirm a response of the second terminal, and then starts the call with the second terminal.

When the first terminal is handed over from the first network to the third network, a specific process in which the first terminal and the second terminal resume the call is as follows: First, the first terminal stores the call signaling a used to establish the call and the second terminal information, the second terminal information being a name of the server with which the second terminal registers. Then, the first terminal constructs call transfer signaling according to the stored call signaling a, the first terminal information, and the second terminal information, the call transfer signaling being the resume request, and the first terminal information being the name of the server with which the first terminal registers through the third network. Specifically, the first terminal constructs a Call-ID and From and To header fields of the call transfer signaling according to the call signaling a, constructs a Refer-To header field of the call transfer signaling according to the first terminal information, and constructs a Request-URL header field of the call transfer signaling according to the second terminal information.

Further, the second terminal sends call signaling b according to the call transfer signaling, and transmits the call signaling b to the first terminal via the server, and the first terminal re-establishes the call with the second terminal according to the call signaling b. It should be noted that the first terminal informs the second terminal through the call transfer signaling that a network of the first terminal has been handed over to change an IP, and the second terminal and the first terminal in the third network re-establish an RTP channel of audio and video, thereby resuming the normal call and ensuring stability of the call after the network handover of the first terminal.

Specifically, the second terminal detects a Refer-To header field after receiving the call transfer signaling, and the second terminal sends the call signaling b when an object displayed in the Refer-To header field is the first terminal with which the second terminal is in communication, a header field of the call signaling b including Answer-After: 0; and the first terminal receives the call signaling b and performs detection, and the first terminal resumes the call with the second terminal when the first terminal detects that the header field of the call signaling b includes Answer-After: 0. It should be further noted that during call resuming, the first terminal only needs to send response signaling b and does not need to send any ring signaling. In this way, time required for the call resuming is shortened, so that stability of a communication device after network handover is ensured, thereby avoiding call interruption caused by the network handover during communication of the communication device.

A system for automatically resuming a call after network handover in the present disclosure includes: a first terminal, a second terminal, and a server, the first terminal and the second terminal being respectively connected to the server, and the first terminal and the second terminal respectively including a call control module and a registration control module, the call control module and the registration control module being connected to each other, where the call control module is configured to establish a call, and the registration control module is configured to register the first terminal and the second terminal with the server. That is, the first terminal and the second terminal establish the call through the respective call control modules, so that the first terminal and the second terminal can conduct audio and video calls.

In addition, the first terminal and the second terminal further include a core control module, the call control module and the registration control module being respectively connected to the core control module, and the core control module being configured to control the call control module and the registration control module.

Figure 1:
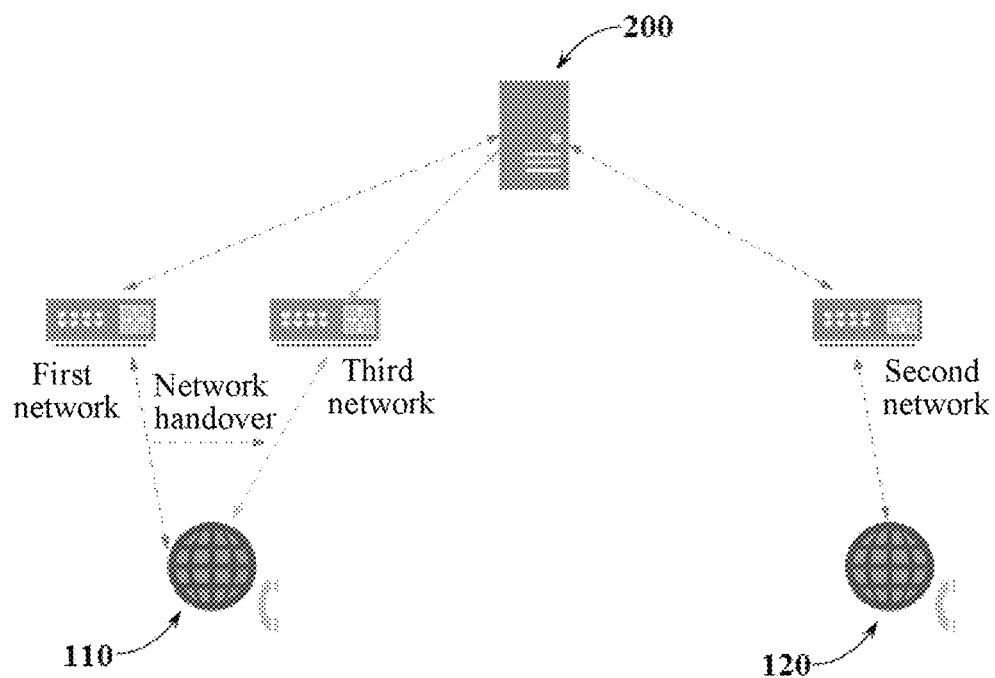
FIG. 1 is a schematic structural diagram of a system for automatically resuming a call after network handover according to the present disclosure.

Reference numerals in the schematic diagrams: 110. First terminal; 120. Second terminal; 200. Server; 310. Call control module; 320. Registration module; 330. Core control module.

DETAILED DESCRIPTION

To make the objectives, technical solutions, and advantages of embodiments of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments of the present disclosure. In addition, the embodiments are not relatively independent of each other, and the embodiments may be combined with each other as required, to achieve a better effect. Therefore, the following detailed descriptions of the embodiments of the present disclosure provided in the accompanying drawings are not intended to limit the protection scope of the present disclosure, but are only intended to represent the selected embodiments of the present disclosure. All other embodiments obtained by a person of ordinary skill in the art based on the embodiments of the present disclosure without creative efforts shall fall within the protection scope of the present disclosure.

To further understand the content of the present disclosure, the present disclosure is described in detail with reference to the accompanying drawings and embodiments.

Embodiment 1

As shown in FIG. 1, the disclosure herein provides a system for automatically resuming a call after network handover: a first terminal 110, a second terminal 120, and a server 200, the first terminal 110 and the second terminal 120 being respectively connected to the server 200. It should be noted that the first terminal 110 and the second terminal 120 are respectively connected to the server 200 through networks, and the network includes a communication network such as 4G, 5G, or a Wi-Fi network. Specifically, the first terminal 110 is connected to the server 200 through a first network, and the second terminal 120 is connected to the server 200 through a second network.

Figure 2:
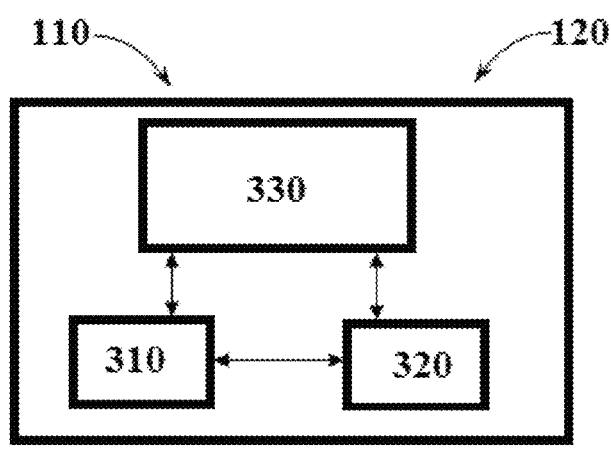
FIG. 2 is a schematic structural diagram of a first terminal and a second terminal according to the present disclosure.

Further, the first terminal 110 and the second terminal 120 respectively include a call control module 310 and a registration module 320 (as shown in FIG. 2), the call control module 310 and the registration module 320 being connected to each other. In addition, the first terminal 110 and the second terminal 120 further include a core control module 330, the call control module 310 and the registration module 320 being respectively connected to the core control module 330. It should be noted that the core control module 330 is configured to control the call control module 310 and the registration module 320, and the registration module 320 is configured to register the first terminal 110 and the second terminal 120 with the server 200. That is, the first terminal 110 and the second terminal 120 may be respectively registered with the server 200 through the registration module 320. Therefore, the first terminal 110 transmits a call request to the second terminal 120 through the server 200, and the second terminal 120 may respond to the call request through the server 200, so that the first terminal 110 and the second terminal 120 can directly conduct audio and video calls through a Real-time Transport Protocol (RTP). It should be noted that data transmission during a call in the present application adopts a P2P mode, that is, the first terminal 110 and the second terminal 120 directly exchange audio and video data, thereby implementing high real-time performance and saving resources of the server 200.

The call control module 310 is configured to establish a call, that is, the first terminal 110 and the second terminal 120 establish a call through the respective call control modules 310, so that the first terminal 110 and the second terminal 120 can conduct audio and video calls. It should be noted that during the call between the first terminal 110 and the second terminal 120, when the first terminal 110 is handed over from the first network to a third network, the call control module 310 of the first terminal 110 may construct a resume request, and the second terminal 120 may resume the call with the first terminal 110 in the third network according to the resume request. The first terminal 110 and the second terminal 120 in the present application are any communication device, and the first network, the second network, and the third network are networks to which the first terminal 110 or the second terminal 120 is connected, and the first terminal 110 or the second terminal 120 has different IP numbers in different networks. When an IP of either the first terminal 110 or the second terminal 120 changes during the call, an IP change event needs to be notified to the other party, and the other party conducts a call with the party whose IP changes through a Real-time Transport Protocol (RTP), so that stability of a communication device after network handover is ensured, thereby avoiding call interruption caused by the network handover during communication of the communication device.

A method for automatically resuming a call after network handover in the present application adopts the above system for automatically resuming a call after network handover. First, a first terminal 110 is registered with a server 200 through a first network, and a second terminal 120 is registered with the server 200 through a second network. Specifically, the first terminal 110 is registered with the server 200 through registration signaling a, and the second terminal 120 is registered with the server 200 through registration signaling b. The registration signaling a and the registration signaling b are sent by respective registration modules 320 of the first terminal 110 and the second terminal 120. Then, the first terminal 110 sends a call request to the second terminal 120 via the server 200, and the second terminal 120 responds to the call request through the server 200 and establishes a call with the first terminal 110. Specifically, the first terminal 110 calls the second terminal 120 through call signaling a, the second terminal 120 accepts the call signaling a of the first terminal 110 through ring signaling a and response signaling a, and the first terminal 110 sends acknowledgement signaling a to confirm a response of the second terminal 120, and starts the call with the second terminal 120.

During the call between the first terminal 110 and the second terminal 120, when the first terminal 110 is handed over from the first network to a third network, the first terminal 110 first stores call resources, then registers with the server 200 through the third network, constructs a resume request according to the stored call resources, first terminal information, and second terminal information, and sends the resume request to the second terminal 120 via the server 200, and the second terminal 120 resumes the call with the first terminal 110 according to the resume request. A specific process is as follows:

When the first terminal 110 is handed over from the first network to the third network, a core control module 330 of the first terminal 110 detects a network handover event, and then the core control module 330 obtains a call status through a call control module 310. When the first terminal 110 is in a call, the core control module 330 controls the call control module 310 to store the call resources. Specifically, the first terminal 110 stores call signaling a used to establish the call and the second terminal information through the call control module 310, the second terminal information being a name of the server 200 with which the second terminal registers 120. Then, the core control module 330 of the first terminal 110 controls the registration module 320 to register with the server 200, and the first terminal 110 constructs call transfer signaling according to the stored call signaling a, the first terminal information, and the second terminal information, the transfer signaling being the resume request, and the first terminal information being the name of the server 200 with which the first terminal 110 registered through the third network. Specifically, the first terminal 110 constructs a Call-ID and From and To header fields of the call transfer signaling according to the call signaling a, and constructs a Refer-To header field of the call transfer signaling according to the first terminal information, and the first terminal 110 constructs a Request-URL header field of the call transfer signaling according to the second terminal information.

Afterwards, the first terminal 110 sends the call transfer signaling to the second terminal 120 through the call control module 310 via the server 200, and the second terminal 120 sends call signaling b according to the call transfer signaling, the call signaling b being transmitted to the first terminal 110 via the server 200. The first terminal 110 re-establishes the call with the second terminal 120 according to the call signaling b, that is, the first terminal 110 resumes the call with the second terminal 120. It should be noted that the first terminal 110 informs the second terminal 120 through the call transfer signaling that a network of the first terminal 110 has been handed over to change an IP, and the second terminal 120 and the first terminal 110 in the third network re-establish an RTP channel of audio and video, thereby resuming the normal call and ensuring stability of the call after the network handover of the first terminal 110.

It should be specifically noted that the second terminal 120 detects a Refer-To header field after receiving the call transfer signaling, and the second terminal 120 sends the call signaling b when an object displayed in the Refer-To header field is the first terminal 110 with which the second terminal is in communication, a header field of the call signaling b including Answer-After: 0. The first terminal 110 receives the call signaling b and performs detection, the first terminal 110 directly sends the response signaling b to the second terminal 120 via the server 200 when the first terminal 110 detects that the header field of the call signaling b includes Answer-After: 0, the second terminal 120 sends acknowledgement signaling b to confirm a response of the first terminal 110, and then the first terminal 110 and the second terminal 120 resume the call. It should be further noted that during call resuming, the first terminal 110 only needs to send response signaling b and does not need to send any ring signaling. In this way, time required for the call resuming is shortened, so that stability of a communication device after network handover is ensured, thereby avoiding call interruption caused by the network handover during communication of the communication device.

Embodiment 2

Figure 3:
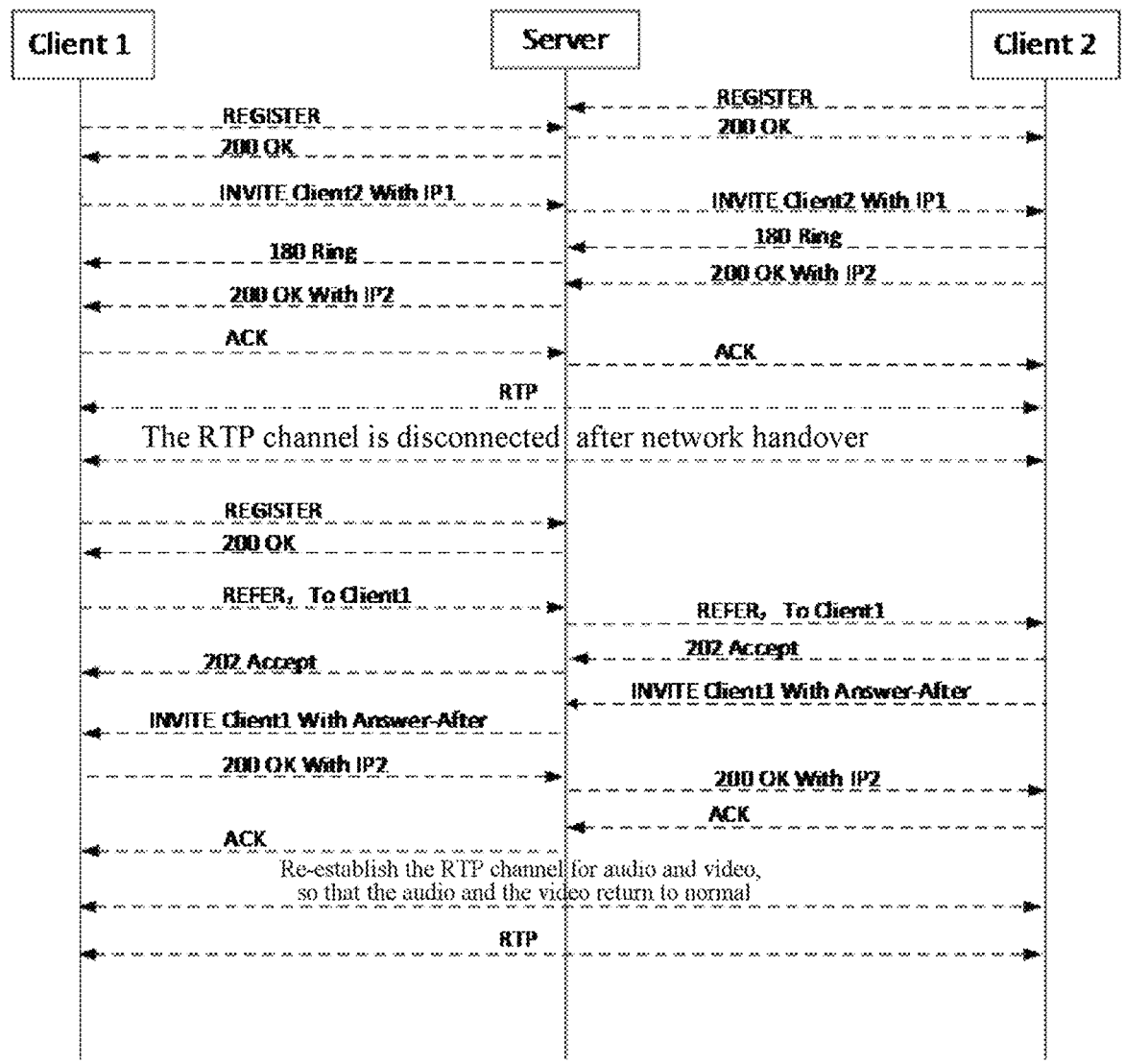
FIG. 3 is a schematic flowchart of a method for automatically resuming a call after network handover in Embodiment 2.

With reference to FIG. 3, a first terminal 110 and a second terminal 120 are both VoIP phones, and a server 200 is a VoIP server. In FIG. 3, Client1 is the first terminal 110, Client2 is the second terminal 120, REGISTER is registration signaling, Server is the server 200, INVITE is call signaling, 180Ring is ring signaling, 200OK and 202Accept are response signaling, ACK is acknowledgement signaling. REFER is call transfer signaling, IP1 is an IP of the first terminal 110 in a first network, IP2 is an IP of the second terminal 120 in a second network, and IP3 is an IP of the first terminal 110 in a third network. A specific procedure of a method for automatically resuming a call after network handover in this embodiment is as follows:

Registration: The first terminal 110 and the second terminal 120 send registration signaling to register with the server 200, and the server 200 sends respectively response signaling to the first terminal 110 and the second terminal 120, indicating successful registration.

Call: The first terminal 110 sends call signaling to the second terminal 120, the call signaling carries an IP number of the first terminal 110 in the first network, and after the second terminal 120 receives the call signaling, the second terminal 120 sends ring signaling and response signaling to the first terminal 110. After the first terminal 110 receives the ring signaling and response signaling, the first terminal 110 sends acknowledgement signaling to the second terminal 120, and the second terminal 120 receives the acknowledgement signaling and establishes an RTP channel with the first terminal 110, so that the first terminal 110 and the second terminal 120 can conduct a call.

Network handover: The first terminal 110 is handed over from the first network to the third network, that is, the IP number IP1 of the first terminal 110 in the first network changes to the IP number IP3 in the third network. In this case, the RTP channel is disconnected.

Call resuming: The first terminal 110 re-registers with the server 200 through the third network first, and then constructs call transfer signaling and transmits the call transfer signaling to the second terminal 120, the second terminal 120 sends call signaling to the first terminal 110 in the third network according to the call transfer signaling, the first terminal 110 sends response signaling to the second terminal 120 after receiving the call signaling, the second terminal 120 sends acknowledgement signaling to the first terminal 110 after receiving the response signaling, and the first terminal 110 receives the acknowledgement signaling and re-establishes the RTP channel with the second terminal 120, so that the call with the second terminal 120 can be resumed.

According to the method for automatically resuming a call after network handover in this embodiment, when one of two parties in communication performs network handover, one party performing network handover only needs to notify the other party of a changed IP number through call transfer signaling, and the other party can re-establish a call with the party performing network handover, so that stability of a communication device after network handover is ensured, thereby avoiding call interruption caused by the network handover during communication of the communication device.

The present disclosure is described in detail above with reference to specific exemplary embodiments. However, it should be understood that various modifications and variations may be made without departing from the scope of the present disclosure defined by the appended claims. The detailed description and the accompanying drawings should be considered as merely illustrative but not intended to be limitative. If any such modifications and variations exists, they all shall fall within the scope of the present disclosure described herein. In addition, the background aims to describing a research and development situation and meaning of this technology, and is not intended to limit the application field of the present disclosure or this application and the present disclosure.

What is claimed is:

1. A method for automatically resuming a call after network handover, the method comprising:
   registering, by a first terminal, with a server through a first network, and registering, by a second terminal, with the server through a second network;
   sending, by the first terminal, a call request to the second terminal via the server, and responding, by the second terminal, to the call request through the server and establishing a call with the first terminal; and
   during the call between the first terminal and the second terminal, when the first terminal is handed over from the first network to a third network, first storing, by the first terminal, call resources, then registering with the server through the third network, constructing a resume request according to the stored call resources, and sending the resume request to the second terminal via the server, and resuming, by the second terminal, the call with the first terminal according to the resume request,
   wherein a specific process in which the first terminal stores the call resources comprises: storing, by the first terminal, first call signaling used to establish the call and second terminal information, the second terminal information being a name of the server with which the second terminal registers,
   wherein a specific process in which the first terminal constructs the resume request according to the stored call resources comprises: constructing, by the first terminal, call transfer signaling according to the stored first call signaling, first terminal information, and the second terminal information, the call transfer signaling being the resume request, and the first terminal information being the name of the server with which the first terminal registers through the third network,
   wherein the method further comprises: sending, by the second terminal, second call signaling according to the call transfer signaling and transmitting the second call signaling to the first terminal via the server, and re-establishing, by the first terminal, the call with the second terminal according to the second call signaling,
   wherein the constructing of the call transfer signaling comprises: constructing, by the first terminal, a Call-ID and From and To header fields of the call transfer signaling according to the first call signaling, constructing a Refer-To header field of the call transfer signaling according to the first terminal information, and constructing a Request-URL header field of the call transfer signaling according to the second terminal information, and
   wherein the method further comprises: detecting, by the second terminal, a Refer-To header field of the call transfer signaling after receiving the call transfer signaling, and sending, by the second terminal, the second call signaling when an object displayed in the Refer-To header field is the first terminal with which the second terminal is in communication, a header field of the second call signaling comprising Answer-After: 0; and receiving, by the first terminal, the second call signaling and performing detection, and resuming, by the first terminal, the call with the second terminal when the first terminal detects that the header field of the second call signaling comprises the Answer-After: 0.

2. The method for automatically resuming a call after network handover according to claim 1, wherein a process of establishing the call between the first terminal and the second terminal comprises: calling, by the first terminal, the second terminal through the first call signaling, accepting, by the second terminal, the first call signaling of the first terminal through ring signaling and response signaling, and sending, by the first terminal, acknowledgement signaling to confirm a response of the second terminal, and then starting the call with the second terminal.

3. The method for automatically resuming a call after network handover according to claim 2, comprising: registering, by the first terminal, with the server through first registration signaling, and registering, by the second terminal, with the server through second registration signaling.

4. A system for automatically resuming a call after network handover, wherein the system adopts the method according to claim 1.

* * * * *